United States Patent
Schramm et al.

(10) Patent No.: US 6,253,123 B1
(45) Date of Patent: Jun. 26, 2001

(54) PROCESS AND DEVICE FOR STABILIZING A VEHICLE DEPENDING ON THE SPEED OF THE VEHICLE

(75) Inventors: Herbert Schramm, Leonberg; Ian Faye, Stuttgart, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/486,145
(22) PCT Filed: May 21, 1999
(86) PCT No.: PCT/DE99/01528
§ 371 Date: May 18, 2000
§ 102(e) Date: May 18, 2000
(87) PCT Pub. No.: WO99/67114
PCT Pub. Date: Dec. 29, 1999

(30) Foreign Application Priority Data

Jun. 23, 1998 (DE) .............................. 198 27 882

(51) Int. Cl.$^7$ .............................. G06F 17/00; G06F 7/00
(52) U.S. Cl. .................................... 701/1; 701/70; 701/78; 701/79; 701/93; 180/170; 303/155; 303/166
(58) Field of Search .................................... 701/1, 70, 78, 701/72, 79, 84, 93; 180/170, 171, 197; 303/124, 147, 155, 166, 167

(56) References Cited

U.S. PATENT DOCUMENTS 5,683,152    11/1997    Hanbin ............................ 303/146

FOREIGN PATENT DOCUMENTS

| 32 22 149 | 11/1983 | (DE) . |
|---|---|---|
| 35 35 843 | 4/1987 | (DE) . |
| 37 35 673 | 5/1989 | (DE) . |
| 44 16 991 | 11/1995 | (DE) . |
| 196 02 879 | 8/1997 | (DE) . |
| 0 758 601 | 2/1997 | (EP) . |
| 0 798 615 | 10/1997 | (EP) . |

Primary Examiner—William A. Cuchlinski, Jr.
Assistant Examiner—Gertrude Arthur
(74) Attorney, Agent, or Firm—Kenyon & Kenyon

(57) ABSTRACT

A method for stabilizing a vehicle that avoids one of a vehicle rolling over with respect to a vehicle axis oriented in the longitudinal direction of the vehicle, and the vehicle skidding in a transverse direction. The method determines a vehicle speed and at least two limit values for the vehicle speed, and selects one of the limit values as a reference quantity. In particular, the limit value with the smaller value may be selected as the reference quantity. The method also compares a speed quantity and the reference quantity, and implements measures to stabilize the vehicle based on the comparison. In particular, if the speed quantity is greater than the reference quantity, then the vehicle speed is reduced by intervening in at least one of a retarder operation, an engine operation and a braking operation until the speed quantity is reduced below the reference quantity.

10 Claims, 6 Drawing Sheets

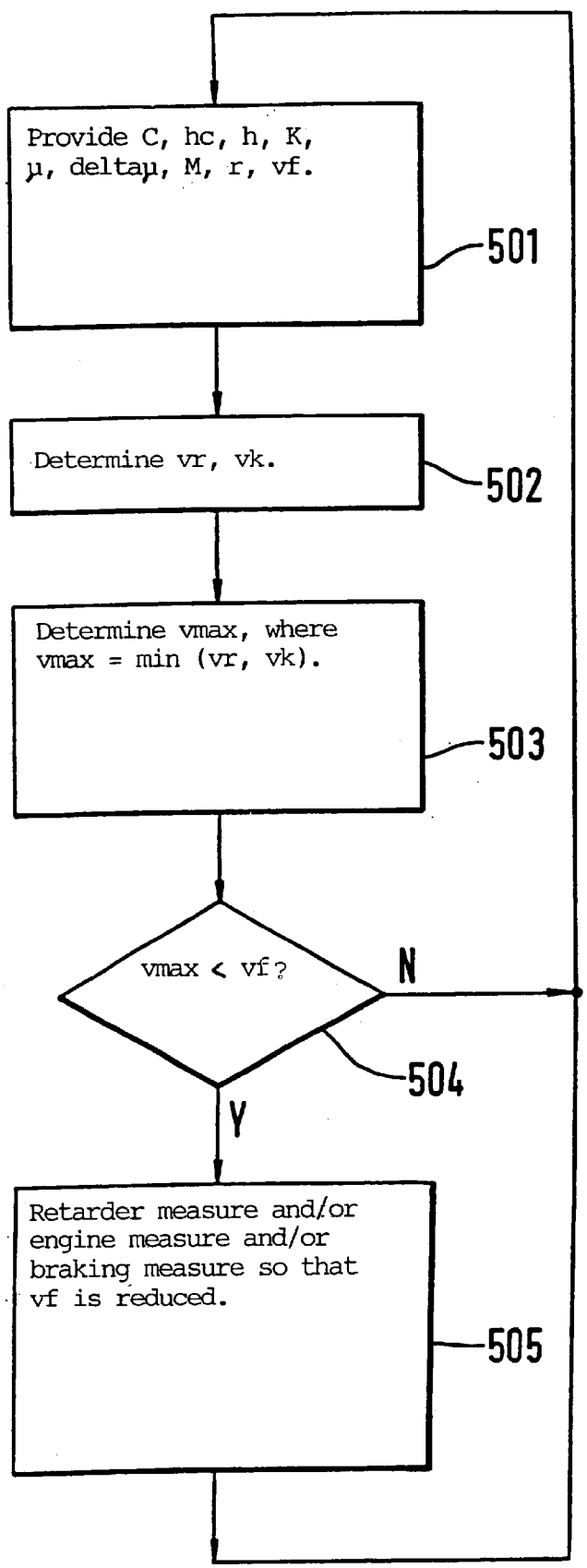

PROCESS AND DEVICE FOR STABILIZING A VEHICLE DEPENDING ON THE SPEED OF THE VEHICLE

FIELD OF THE INVENTION

The present invention relates to a method and a device for stabilizing a vehicle.

BACKGROUND INFORMATION

German Published Patent Application No. 44 16 991 A1 concerns a method and a device for warning truck drivers of the risk (or danger) of rollover (or overturning) when cornering. For this purpose, before the vehicle enters into a turn, the type of vehicle and the condition information relevant for the risk of rollover, such as the weight of the vehicle and the vehicle speed, are determined. Depending on the center of gravity of the vehicle and the radius of the curve, the risk of rollover and the limit (or threshold) speed for that risk are determined. A signal is triggered indicating that the speed must be reduced if the instantaneous traveling speed could cause a rollover risk or the margin of the rollover risk is below a predetermined (or preselected) safety margin. There is a predetermined safety margin of the allowed traveling speed with respect to the traveling speed at the limit of the risk of rollover.

One disadvantage of the System of German Patent Published Patent Application No. 44 16 991 A1 is that when there is a risk of rollover, merely a signal warning the driver is generated instead of having measures implemented automatically or independently of the driver to reduce the speed of the vehicle and thus prevent the risk of rollover. Due to this procedure, there is no longer time to react to an imminent risk of rollover under some circumstances.

German Published Patent Application No. 32 22 149 A1 concerns a device for preventing side rollover of a vehicle. To do so, a static stability is determined as a function of the track and the height of the center of gravity. By multiplying by two different safety factors, two allowed limits are determined from this information. A dynamic instability is determined on the basis of the driving speed of the vehicle, the radius of the curve and the acceleration due to gravity. In two comparisons, this dynamic instability is compared in each case with one of the two allowed limits. If the dynamic instability is greater than the first allowed limit, the gear clutch is released. If the dynamic instability is greater than the second allowed limit, the vehicle's brakes are operated.

Releasing the gear clutch as the first measure to reduce the vehicle speed is a critical intervention or measure because when driving on a gradient, for example, this would not result in a reduction in speed but instead would necessarily increase speed. This risk would not exist with, for example, a straddle loader, the vehicle referred to in German Published Patent Application No. 32 22 149 A1, because such a straddle loader is usually operated on flat terrain.

BRIEF SUMMARY OF THE INVENTION

An object of an exemplary embodiment of the present invention is to provide devices and methods for stabilizing a vehicle, in which not only is the driver warned when a speed quantity is greater than a corresponding reference value, but measures are implemented to stabilize the vehicle. In particular, only measures that would not increase in the risk for the vehicle in any driving situation should be implemented.

Another object of an exemplary embodiment of the present invention is to determine and/or observe various critical situations for the vehicle with the help of a respective limit value for the vehicle speed and to select the critical situation that is the most critical in the given driving situation and to implement the stabilization of the vehicle with respect to this critical situation.

The method according to an exemplary embodiment of the present invention is a method of stabilizing a vehicle. In particular, this should prevent a vehicle from rolling over about a vehicle axis oriented in the longitudinal direction of the vehicle and/or prevent the vehicle from skidding in the transverse direction. For the purpose of illustration, it should be pointed out that there is a risk of rollover if a high transverse acceleration acts on a vehicle at a high coefficient of friction. However, if there is a low coefficient of friction, there is the risk of skidding (or sliding) in the transverse direction.

It should be explained how the phrase "a vehicle axis oriented in the longitudinal direction of the vehicle" should be understood. First, the vehicle axis about which the vehicle may have a tendency to roll over may be the actual longitudinal axis of the vehicle. Second, it may be a vehicle axis which is rotated by a certain angle with respect to the actual longitudinal axis of the vehicle. It does not matter here whether the rotated vehicle axis passes through the center of gravity of the vehicle. The case of the rotated (or offset) vehicle axis should also allow such an orientation of the vehicle axis where the vehicle axis corresponds either to a diagonal axis of the vehicle or to an axis parallel to the diagonal. Furthermore, it should also be pointed out that the phrase "skidding of the vehicle in the transverse direction" also includes spinning of the vehicle.

The method according to an exemplary embodiment of the present invention is advantageously based on a speed comparison. For this purpose, a speed quantity which describes the vehicle speed is determined. In addition, at least two limit values for the vehicle speed are determined. Of these two limit values, one is selected as the reference quantity. In particular, the limit values with the smaller value is selected as the reference quantity. The comparison is performed as a function of the speed quantity and the reference quantity, and measures for stabilizing the vehicle are implemented as a function of this comparison. For the case when the instantaneous speed quantity is greater than the reference quantity, the vehicle speed is reduced at least by retarder measures and/or by engine measures and/or by braking measures on at least one wheel to the extent that the speed quantity resulting from these measures is less than or equal to the reference quantity. The measures in this regard are preferably implemented as a function of the difference between the speed quantity and the reference quantity.

Thus, at least two different critical situations can be detected and/or observed. Selecting one of the limit values as the reference quantity ensures that the vehicle will be stabilized for the situation where there is the greater risk for the vehicle.

Two limit values are preferably determined. A first limit value corresponds to a quantity describing the rollover risk of the vehicle. A second limit value corresponds to a quantity describing the skidding risk of the vehicle, in particular the risk of skidding in the transverse direction. Consequently, the risk of rollover of the vehicle is determined and/or observed with the help of the first limit value, and the risk of skidding or spinning of the vehicle is determined and/or observed with the help of the second limit value.

A mass quantity which describes the mass of the vehicle may be determined. This mass quantity is determined at least as a function of a quantity describing the driving force acting on the vehicle and as a function of quantities describing the wheel rpm. At least one limit value for the vehicle speed is determined as a function of this mass quantity. Since the forces acting on the vehicle in cornering, such as, for example, the centrifugal force, depend on the vehicle mass, the mass quantity enters directly into the determination of the limit value.

Since the second limit value corresponds to a quantity describing the risk of skidding of the vehicle, it is necessary in this regard to determine at least one friction quantity that describes describing the friction conditions between the tires and the road surface prevailing in the given driving situation. It is believed that it is advantageous to determine two friction quantities. A first friction quantity describes the coefficient of friction prevailing instantaneously and a second describes the difference between the coefficients of friction on the right and left sides of the vehicle. Therefore, different coefficients of friction are determined on the basis of different road surface properties accordingly.

With the method according to an exemplary embodiment of the present invention, a torsion quantity is advantageously determined and/or preselected. This torsion quantity characterizes how the vehicle behaves in reaction to a force acting on the vehicle about a vehicle axis oriented in the longitudinal direction of the vehicle. This force acting on the vehicle is in particular a transverse force. The torsion quantity characterizes in particular the extent to which the vehicle is twisted and/or displaced and/or deflected about the vehicle axis mentioned above. For example, a rolling motion of the vehicle should be included in the torsion quantity. Since the torsion quantity describes the behavior of the vehicle about a vehicle axis oriented in the longitudinal direction of the vehicle, it thus also describes the displacement of the center of gravity of the vehicle about this axis. The displacement of the center of gravity influences the performance of the vehicle with respect to any possible risk of rollover or skidding. Thus, with a knowledge of the torsion quantity of the vehicle, a more precise and thus better stabilization of the vehicle can be implemented. To this end, the limit values for the vehicle speed are determined as a function of the value of the torsion quantity (or variable). The torsion quantity in turn is determined at least as a function of the mass quantity (or variable) which describes the mass of the vehicle.

The distance between the center of gravity of the vehicle and the road surface has a significant influence on the behavior of the vehicle with respect to the risk of skidding or rollover of the vehicle. Thus, for example, the risk of rollover of a vehicle in cornering is greater, the higher the center of gravity of the vehicle. For this reason, a first height quantity which describes this distance is determined in the method according to an exemplary embodiment of the present invention. This first height quantity is determined at least as a function of quantities describing the wheel rpm. At least one limit value for the vehicle speed is determined as a function of this first height quantity.

Likewise, the distance between the road surface and a vehicle axis oriented in the longitudinal direction of the vehicle about which the vehicle is twisted and/or displaced and/or deflected in reaction to a force acting on the vehicle, in particular in reaction to a transverse force, also influences the risk of rollover or skidding of the vehicle. Thus, for example, the risk of rollover of the vehicle is greater, the higher this axis is located in the vehicle. To take this influence into account, a second height quantity is determined, describing the distance between the axis described above and the road surface. This second height quantity is determined at least as a function of the mass quantity which describes the mass of the vehicle. At least one limit value for the vehicle speed is determined as a function of this second height quantity.

Furthermore, the risk of rollover or skidding of the vehicle is influenced by the displacement of the load transported with the vehicle especially in cornering. For this reason, for vehicles having a mobile load, especially a liquid load, a load displacement quantity is determined or a corresponding load displacement quantity is preselected. This load displacement quantity characterizes how the load of the vehicle behaves in reaction to a force acting on the vehicle, in particular in reaction to a transverse force, and in particular the extent to which the load of the vehicle is displaced and/or deflected because of a force acting on the vehicle. To take this load displacement into account, the limit values for the vehicle speed are determined at least as a function of the value of this load displacement quantity.

The load displacement quantity is determined at least as a function of a mass quantity which describes the mass of the vehicle. For example, with a mobile load, especially a liquid load, the volume of the load is determined as a function of this mass quantity, and the load displacement quantity is determined as a function of this volume. In addition, the quantity describing the load displacement quantity is determined as a function of a quantity characterizing the equipment provided on the vehicle to accommodate the load. In particular, the value of the quantity characterizing the equipment provided on the vehicle to accommodate the load depends at least on the form of this equipment. In vehicles that transport a liquid load, the volume of the liquid load can advantageously be determined directly during the loading and/or unloading of the equipment for accommodating the load. Then, the load displacement quantity is determined as a function of this volume.

In addition to the quantities described so far, a path quantity which describes the radius of the path instantaneously being traveled by the vehicle, in particular the corner being turned instantaneously by the vehicle is also important with regard to the risk of rollover or skidding. The smaller the radius of the curve at a constant vehicle speed, the greater are the transverse forces acting on the vehicle and the greater is the risk of rollover or skidding. For this reason, the limit values for the vehicle speed are determined as a function of this path quantity. The path quantity in turn is determined as a function of the speed quantity and a steering angle quantity which describes the steering angle of the vehicle.

The method according to an exemplary embodiment of the present invention has the advantage that no additional sensor technology is required in addition to the sensors used in a system for regulating a quantity describing the driving dynamics of the vehicle. Such a system for regulating a quantity concerning the driving dynamics of the vehicle is discussed for passenger vehicles, for example, in the article "FDR—Die Fahrdynamikregelung von Bosch" [FDR—the Bosch method of regulating driving dynamics] published in the automotive engineering journal *Automobiltechnische Zeitschrift (ATZ)* vol. 96, No. 11 (1994) pages 674 through 689, or for commercial vehicles in the SAE paper 973284 "Vehicle dynamics control for commercial vehicles."

Analyzing the steering angle as an input quantity in the method according to an exemplary embodiment of the present invention has the following advantages: cornering is initiated by a steering angle selected by the driver.

Consequently, by analyzing the steering angle in advance, i.e., before the actual risk situation occurs, it is possible to ascertain whether there is a risk of rollover or skidding for the vehicle. In other words, if there is such a risk, stabilizing measures can be taken very quickly and thus in due time. In other words, analyzing the steering angle corresponds to implementation of a preview function. Furthermore, stabilizing measures are implemented only in cornering, i.e., stabilizing measures which would be perceived as causing a problem when driving straight ahead are suppressed from the beginning.

BRIEF DESCRIPTION OF THE DRAWINGS

FIG. 5 shows a flow-chart of the method according to an exemplary embodiment of the present invention.

DETAILED DESCRIPTION

Figure 1A:
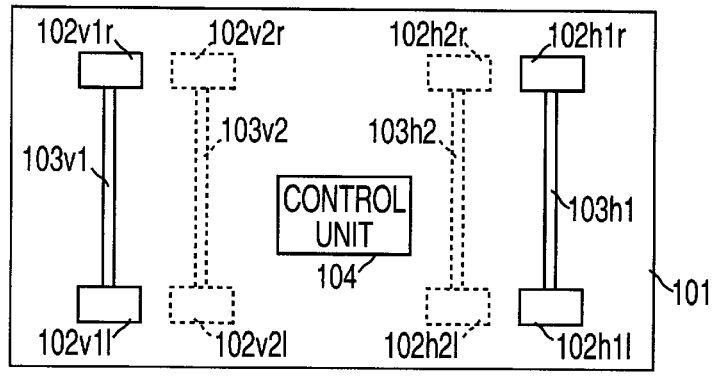
FIG. 1a shows a one-piece vehicle, with which a method according to an exemplary embodiment of the present invention may be used.
Figure 1B:
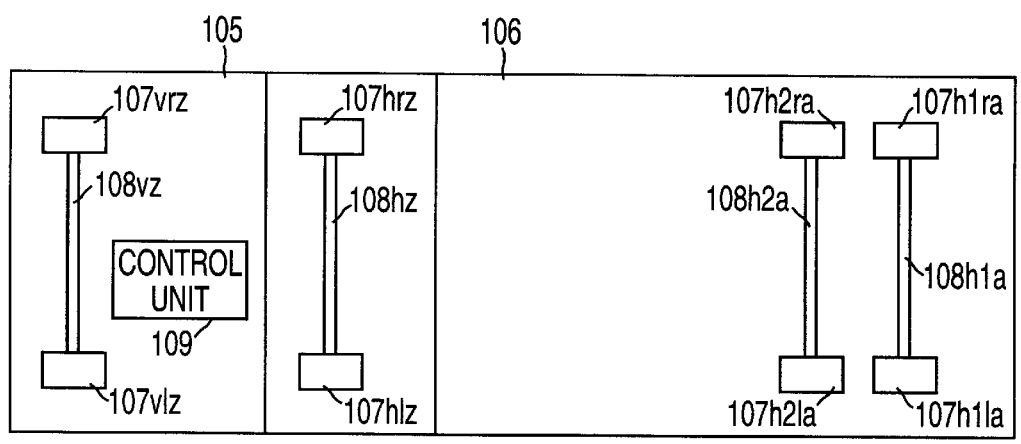
FIG. 1b shows a two-piece vehicle, with which a method according to an exemplary embodiment of the present invention may be used.

First, FIGS. 1a and 1b showing a one-piece and a two-piece road vehicle, respectively, where the method according to an exemplary embodiment of the present invention can be used will be discussed.

FIG. 1a shows a one-piece vehicle 101. This vehicle may be a passenger vehicle or a commercial vehicle. This vehicle should have at least two wheel axles, as indicated by the partial use of dotted lines. The wheel axles of vehicle 101 corresponds to a designation 103$ix$, which is an abbreviated notation for the wheel axles, where the index i indicates whether a front axle (v) or a rear axle (h) is involved. For vehicles with more than two axles, the index x indicates which of the front or rear axles is involved. The following correlation is used: the front axle and the rear axle closest to the edge of the vehicle is assigned index x with the smallest value. The greater the distance from the respective wheel axle to the edge of the vehicle, the greater is the value of respective index x. Thus, axles 103$v1r$, 103$v2$, 103$h2$ and 103$h1$ are shown. Wheels 102$ixj$ are assigned to wheel axles 103$ix$. Index j indicates whether the wheel is on the right (r) or left (l) side of the vehicle. Thus, wheels 102$v1r$, 102$v1l$, 102$v2r$, 102$v2l$, 102$h2r$, 102$h2l$, 102$h1r$ and 102$h1l$ are shown . Furthermore, vehicle 101 has a control unit 104 in which the device according to an exemplary embodiment of the present invention is implemented for carrying out the method according to an exemplary embodiment of the present invention.

FIG. 1b shows a vehicle combination that includes of a towing vehicle 105 and a trailer 106. FIG. 1b is not intended to be restrictive. Thus a vehicle combination having a towing vehicle and a draw-bar trailer may also be used, for example. Towing vehicle 105 should have wheel axles 108$iz$, namely 108$vz$ and 108$hz$. Wheels 107$ijz$, namely 107$vrz$, 107$vlz$, 107$hrz$ and 107$hlz$, are assigned to wheel axles 108$iz$. Index z indicates that these are wheels and wheel axles of the towing vehicle. Furthermore, towing vehicle 105 has a control unit 109 in which the process according to an exemplary embodiment of the present invention takes place and with which both towing vehicle 105 and trailer 106 are stabilized. Trailer 106 should have two wheel axles 108$ixa$, namely 108$h1a$ and 108$h2a$. Similarly, wheels 107$ixja$, namely 107$h2ra$, 107$h2la$, 107$h1ra$ and 107$h1la$, are assigned to two wheel axles 108$ixa$. Index a indicates a component of trailer 106. The number of wheel axles shown in FIG. 1b for towing vehicle 105 and for trailer 106 is not intended to be restrictive. Control unit 109 may also be arranged in trailer 106 instead of in towing vehicle 105. Furthermore, it is conceivable for both towing vehicle 105 and trailer 106 to be equipped with a control unit.

The labeling with indices a, i, j, x and z used in FIGS. 1a and 1b is the same accordingly for all quantities (or variables) and all components with which it is used.

FIGS. 2a through 2d are discussed below. These figures illustrate the physical state of affairs on which the method and the device according to an exemplary embodiment of the present invention are based, as discussed below.

Figure 2A:
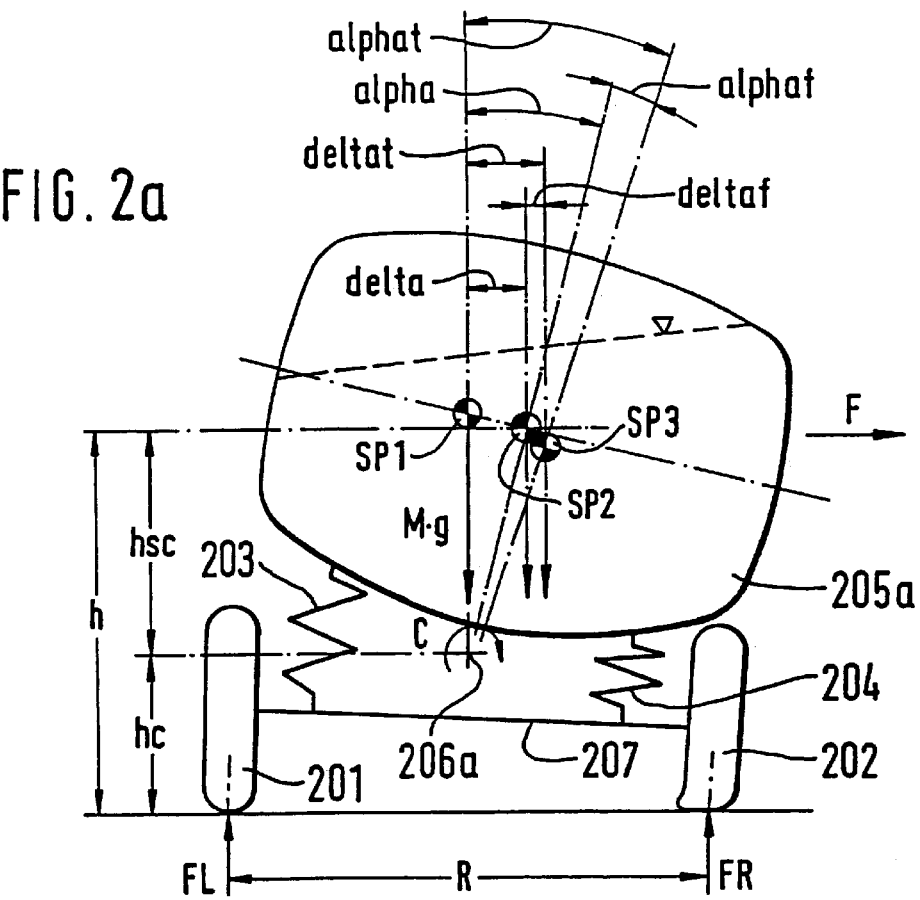
FIGS. 2a, 2b, 2c, and 2d show conditions for which the method and the device according to exemplary embodiments of the present inventions may be used with different types of vehicles, including commercial vehicles for transporting liquid and non-liquid loads, as well as passenger vehicles.

FIG. 2a shows a vehicle for transporting a mobile load, and in particular a liquid load. An example that can be mentioned for this would be a tank car or tanker. The sectional diagram shows wheels 201 and 202 which are connected to an axle 207, for example. A vehicle body 205a which contains the load to be transported is connected to axle 207 by suspension equipment 203 and 204. The vehicle illustrated in FIG. 2a is turning a corner to the left, and R denotes the track of the vehicle.

The influence of torsion, described by torsion quantity C, and the influence of load displacement, described by load displacement quantity K, are illustrated with the vehicle shown in FIG. 2a.

Quantity h indicates the distance between the road surface and the center of gravity of the vehicle. The force of gravity acting on the vehicle at the center of gravity is represented by quantity M·g. Quantity hc indicates the distance between the road surface and a vehicle axis 206a which is oriented in the longitudinal direction of the vehicle and about which the vehicle is twisted and/or displaced and/or deflected in reaction to a force acting on the vehicle. Quantity hsc, which indicates the distance between the center of gravity of the vehicle and the vehicle axis 206a described above can be determined from quantity h and quantity hc by subtraction, for example. Additionally, C denotes the torsion quantity that describes the behavior of the vehicle about vehicle axis 206a described above in reaction to a force, in particular a transverse force, acting on the vehicle. This force is shown as force F in FIG. 2a. This should be the centrifugal force which occurs due to cornering. Forces FL and FR act on the wheels of the vehicle.

SP1 denotes the center of gravity of the vehicle, such as that in driving straight ahead, for example. The torsion-induced vertical displacement of the center of gravity from SP1 to SP2 due to cornering is represented by delta. The vehicle is deflected by angle alpha based on axis 206a. The displacement or deflection due to load displacement is superimposed on that due to torsion. The displacement due to load displacement is labeled as deltaf and the respective deflection is alphaf. This causes a displacement of the center of gravity from SP2, to SP3. Thus, on the whole this yields a displacement deltat and a deflection alphat and thus a displacement of the center of gravity from SP1 to SP3. In addition, forces FL and FR are altered by the torsion-induced and load displacement-induced displacement and deflection to the extent that the corresponding forces on the wheels on the inside of the curve decrease and the forces on the wheels on the outside of the curve increase.

It can be seen on the basis of the diagram in FIG. 2a that with commercial vehicles in particular, attention must be paid to the behavior of the vehicle in space because of the elevated and variable location of the center of gravity. Vehicles that transport liquid loads are at particular risk. In addition to the torsion-induced influences, the influences resulting from a displacement of the liquid to the side of the vehicle on the outside of the curve must also be taken into account. The statements made above also apply accordingly to passenger vehicles.

In this regard, reference should also be made here to FIG. 2d, which is described below. It should be pointed out here that torsion quantity C mentioned above should include all the torsion-induced influences acting on the vehicle, i.e., torsion quantity C describes the total torsional rigidity of the vehicle, which includes the individual torsional rigidities for the frame, the tires and the suspension equipment, for example.

Figure 2B:
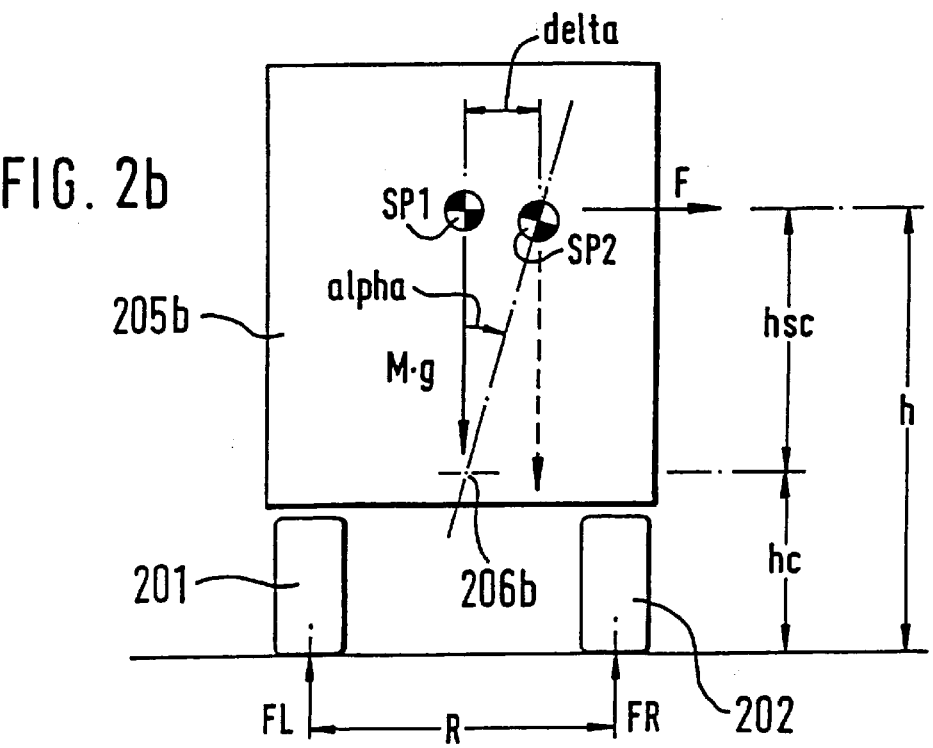

FIG. 2b shows a vehicle, in particular a commercial vehicle, which is usually used for transporting a non-mobile load. For the sake of simplicity, the suspension equipment has not been shown here. In the case discussed here, no load displacement need be assumed or it is negligible, so the center of gravity is shifted and/or deflected only from SP1 to SP2 due to torsion. However, due to different loading of the vehicle, there is a change in the location of the center of gravity and thus at least a change in quantities hsc and h.

Figure 2C:
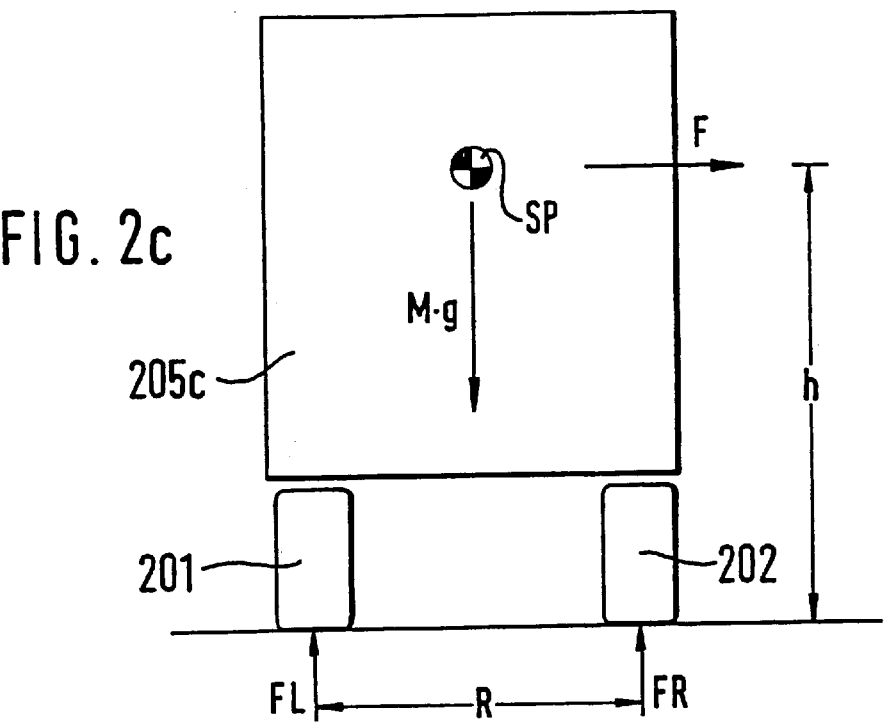
Figure 2D:
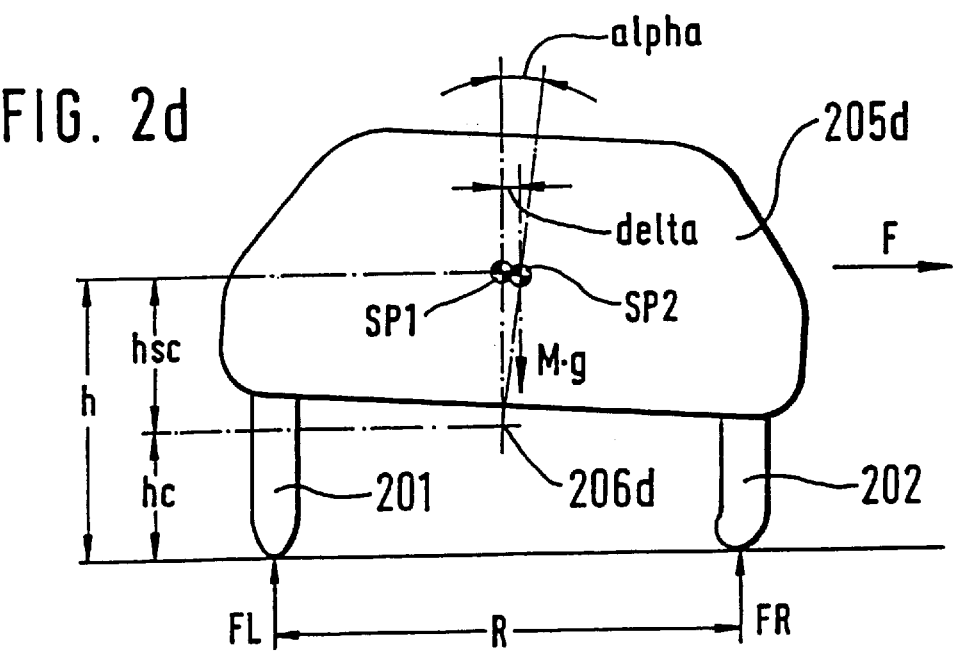

Corresponding to the diagram in FIG. 2b, FIG. 2d illustrates the same state of affairs for a passenger vehicle. Primarily a torsion-induced displacement and/or deflection of the center of gravity is to be expected with a passenger vehicle. A displacement and/or deflection due to load displacement may occur in rare cases, e.g., with pickup trucks or similar small trucks.

FIG. 2c shows a vehicle that should not have displacement and/or deflection of the center of gravity due to either torsion or load displacement.

The illustrations of the various vehicles in FIGS. 2a through 2d should show that the method according to an exemplary embodiment of the present invention can be used for any desired vehicles. Thus, for example, the method according to an exemplary embodiment of the present invention can be used with vehicles where there is a displacement and/or deflection of the center of gravity due to torsion and/or load displacement. Likewise, the method according to an exemplary embodiment of the present invention can be used on vehicles where there is only a displacement and/or deflection of the center of gravity due to torsion. In addition, the method according to an exemplary embodiment of the present invention can be used on vehicles where there is no displacement or deflection of the center of gravity due to either torsion or load displacement. The method according to an exemplary embodiment of the present invention can also be used for buses, for example.

Figure 3:
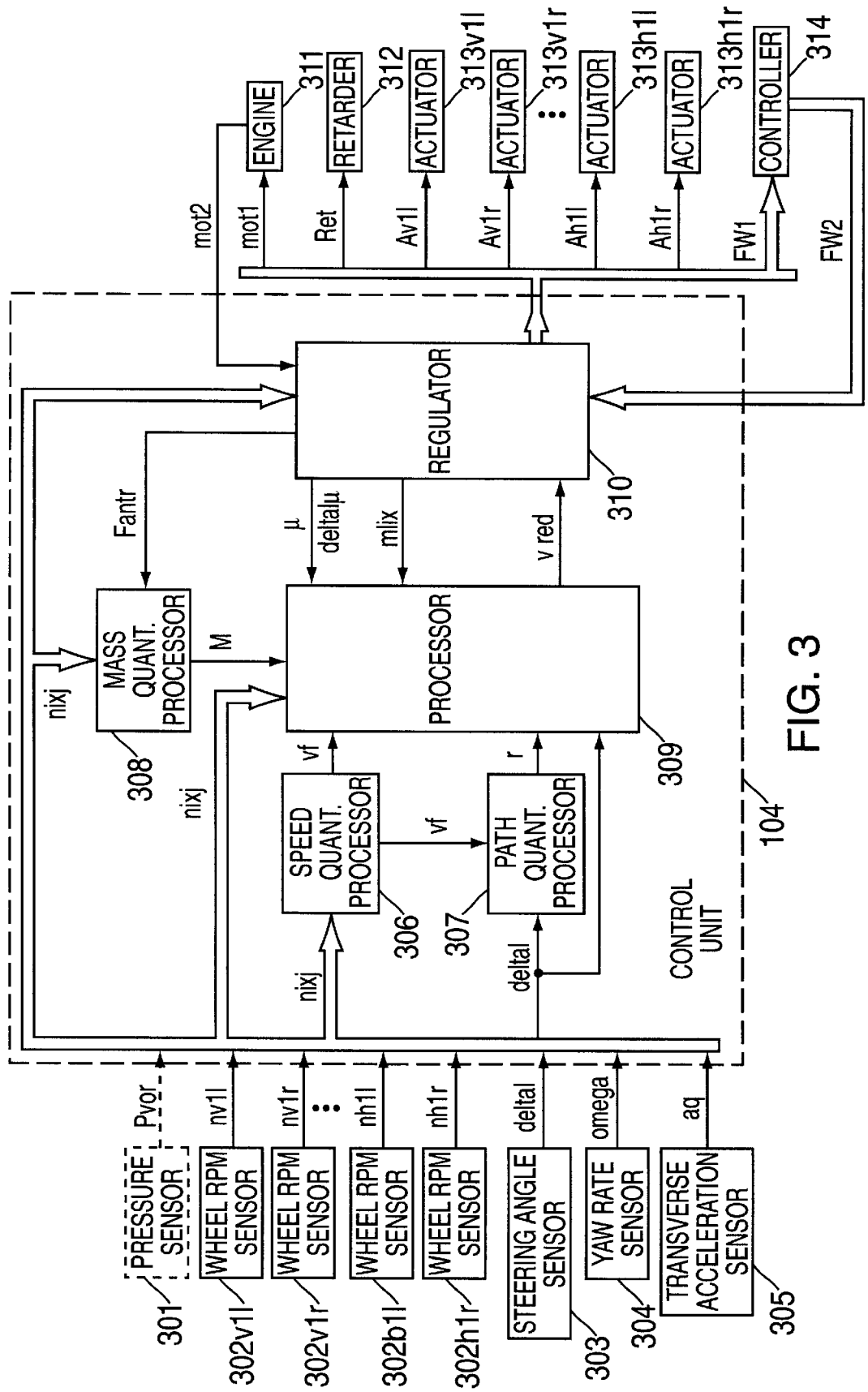
FIG. 3 shows a system for performing a method according to an exemplary embodiment of the present invention.

FIG. 3 is based on a one-piece vehicle like that illustrated in Figure 1a, for example. For this reason, control unit 104 is shown in FIG. 3.

Because an object of an exemplary embodiment of the present invention may, for example also apply to apply to a vehicle like that shown in FIG 1b, corresponding modification may, of course, be necessary on the basis of FIG. 3.

It shall be assumed that the one-piece vehicle has at least two wheel axles, a front axle 103$vl$ having wheels 102$vlr$ and 102$vll$ and a rear axle 103$hl$ and wheels 102$hlr$ and 102$hll$. Wheel rpm sensors 302$ilj$ belonging to these wheels are shown in FIG. 3. Additional wheel rpm sensors 302$ixj$ are added, depending on the number of wheel axles of the one-piece vehicle, as indicated in FIG. 3. Wheel rpm sensors 302$ixj$ determine quantities nixj which describe the wheel rpm of corresponding wheel 102$ixj$. Quantities nixj are sent to blocks 306, 308, 309 and 310. Wheel rpm sensors 302$ixj$ are present in any case, regardless of the type of regulator 310.

Furthermore, the vehicle has a sensor 303 with which a steering angle quantity deltal describing the steering angle of the vehicle is determined. This sensor 303 is also present in any case, regardless of the type of regulator 310. Steering angle quantity deltal is sent to a block 307, a block 309 and block 310.

Block 310 represents the regulator or vehicle regulator implemented in control unit 104. This regulator 310 is generally a slip regulator. This slip regulator may be designed, for example, as a brake slip regulator and/or as a drive slip regulator. In the exemplary embodiment, it is a slip regulator or a regulator which regulates in its basic function a quantity describing the driving dynamics of the vehicle, e.g., a quantity that depends on the transverse acceleration and/or yaw rate of the vehicle, and it does so at least through measures influencing the wheel brake and/or the engine. At this point, reference should be made to the publication mentioned above "FDR—Die Fahrdynamikregelung von Bosch" [FDR—the Bosch method of regulating driving dynamics] and the SAE paper 973284, in which a system for regulating a quantity describing the driving dynamics of the vehicle is discussed.

Block 310 will be discussed in detail below. Block 310 is mentioned here with respect to the sensor technology to be described below. Block 310 is a regulator for regulating a quantity which describes the driving dynamics of the vehicle, as mentioned above, so additional sensors are necessary to implement this regulation. Depending on the type of brake system the vehicle has, a sensor 301 for detecting a pressure quantity Pvor which describes the precompression established by the driver is necessary. The dotted line is intended to indicate that sensor 301 is necessary with a hydraulic brake system, but it is not necessary with a pneumatic brake system. Likewise, a sensor 304 is necessary for detecting yaw rate omega of the vehicle, and a sensor 305 is necessary for detecting transverse acceleration aq acting on the vehicle. The quantities detected with sensors 301, 304 and 305 are sent to block 310. It should also be pointed out here that sensors 301, 304 and 305 are not absolutely necessary. If another type of regulator or slip regulator is implemented with block 310, then these sensors can be omitted entirely.

In block 306, a quantity vf which describes the speed of the vehicle is determined from wheel rpm values nixj in a known manner and sent to blocks 307 and 309. In block 307, a path quantity r describing the radius of the path traveled by the vehicle instantaneously, in particular a corner being turned by the vehicle instantaneously, is determined on the basis of vehicle speed vf and steering angle quantity deltal. Quantity r is determined using the following equation, for example:

$$r = \frac{1+\left(\frac{vf}{vch}\right)^2}{deltal} \cdot il \cdot l \qquad (1)$$

In equation (1), quantity il represents the total steering ratio, quantity vch represents a characteristic speed of the vehicle and quantity l represents the wheel base. Quantity r is sent to block 310.

In addition to quantities nixj mentioned above, a quantity Fantr is sent from block 310 to block 308. This quantity describes the driving force acting on the vehicle. It is determined in block 310 in a known way at least as a function of quantities describing the engine performance; engine rpm is given here as an example. A mass quantity M which describes the mass of the vehicle is determined in block 308 on the basis of the quantities supplied to it. This mass quantity is sent to block 309.

Block 309 determines on the basis of a speed comparison whether it is necessary to reduce the speed of the vehicle, so that the vehicle will not roll over about a vehicle axis oriented in the longitudinal direction of the vehicle and/or the vehicle will not skid in the transverse direction. To perform this speed comparison, quantities M, nixj, vf, r and deltal mentioned above are sent to block 309. In addition, two friction quantities $\mu$ and delta$\mu$ as well as quantities that are sent from block 310 to block 309. Both quantities $\mu$ and delta$\mu$ are friction quantities which describe the friction conditions prevailing between the tires and the road surface in the respective vehicle situation. Quantity $\mu$ describes the instantaneous coefficient of friction, and it is estimated in block 310 as a function of the longitudinal acceleration and transverse acceleration, for example. Quantity delta$\mu$ describes the difference between the coefficients of friction on the right and left sides of the vehicle. In a braking operation, quantity delta$\mu$ is determined in block 310 as a function of the wheel brake cylinder pressures and the wheel speeds, for example. In this connection, reference is made to German Published Patent Application No. 35 35 843 A1. As an alternative, quantity deltas can also be determined in block 310 as a function of the engine torque and the wheel speeds. In this regard, reference is made to German Published Patent Application No. 37 35 673 A1, for example.

Quantities mlix represent the axle-specific wheel loads. They are determined in block 310, for example, from the wheel rpm in a known way.

The result of the speed comparison is output with the help of quantity vred. For example, the following assignment should apply: if a reduction in vehicle speed is necessary, a value TRUE is assigned to quantity vred. However, if no reduction in vehicle speed is necessary, a value FALSE is assigned to quantity vred. Quantity vred is sent to block 310. The procedure for performing the speed comparison will be discussed in detail in conjunction with FIGS. 4 and 5.

As mentioned above, block 310 is the vehicle regulator implemented in the control unit. This vehicle regulator is a regulator for regulating a quantity describing the driving dynamics of the vehicle, for example, as described in the above-mentioned publication "FDR—Die Fahrdynamikregelung von Bosch" [FDR—the Bosch method of regulating driving dynamics] and the SAE paper 973284. The regulator 310 performs this regulation of the quantity describing the driving dynamics of the vehicle as a function of the quantities detected with the help of sensor 301 (if present) and sensors 302ixj, 303, 304 and 305 as well as quantity mot2, which describes the engine rpm or the torque of engine 311, for example. On the basis of the quantities listed above, regulator 310 determines control signals for implementing of the slip control as a basic function in regulator 310 at least for engine 311 and actuators 313ixj. For controlling engine 311, a quantity mot1 is determined in block 310 and sent to the engine. This quantity mot1 represents, for example, the throttle valve setting to be established. For actuators 313ixj, which are designed as wheel brakes, for example, quantities Aixj are determined in block 310 and sent to the respective actuator. Quantities Aixj represent, for example, the control signals for the valves assigned to the wheel brakes. In addition, a retarder 312 may be provided for actuators 313ixj. To control the retarder, a quantity Ret is determined in block 310 and sent to the retarder.

It should be pointed out here that the brake system may be a hydraulic or electrohydraulic or pneumatic or electropneumatic or electromechanical brake system.

In addition to the regulation implemented in regulator 310 as its basic function, regulator 310 the regulator 310 also has the function of stabilizing the vehicle so that the vehicle is prevented from rolling over about a vehicle axis oriented in the longitudinal direction of the vehicle and/or skidding in the transverse direction. As part of this stabilization, the regulator fulfils two functions: first, for the case when quantity vred is assigned a value TRUE, corresponding control signals are generated for engine 311, actuators 313ixj, retarder 312 and controller or controlling means 314, which may be known from the related art for influencing the chassis, so that said rollover or skidding of the vehicle is prevented. For controller or controlling means 314, regulator 310 generates a quantity FW1. At the same time, a quantity FW2 which describes the instantaneous settings of the chassis and is required in regulator 310 as a feedback for the control is sent from controllero or controlling means 314 to regulator 310. The control to prevent rollover or skidding may be superimposed on the control taking place according to the basic function. Or the control according to the basic function is blanked out for the time during which control to prevent rollover or skidding is implemented. Second, quantities $\mu$, delta$\mu$, mlix and Fantr mentioned above are determined in regulator 310 and sent to their respective blocks.

Figure 4:
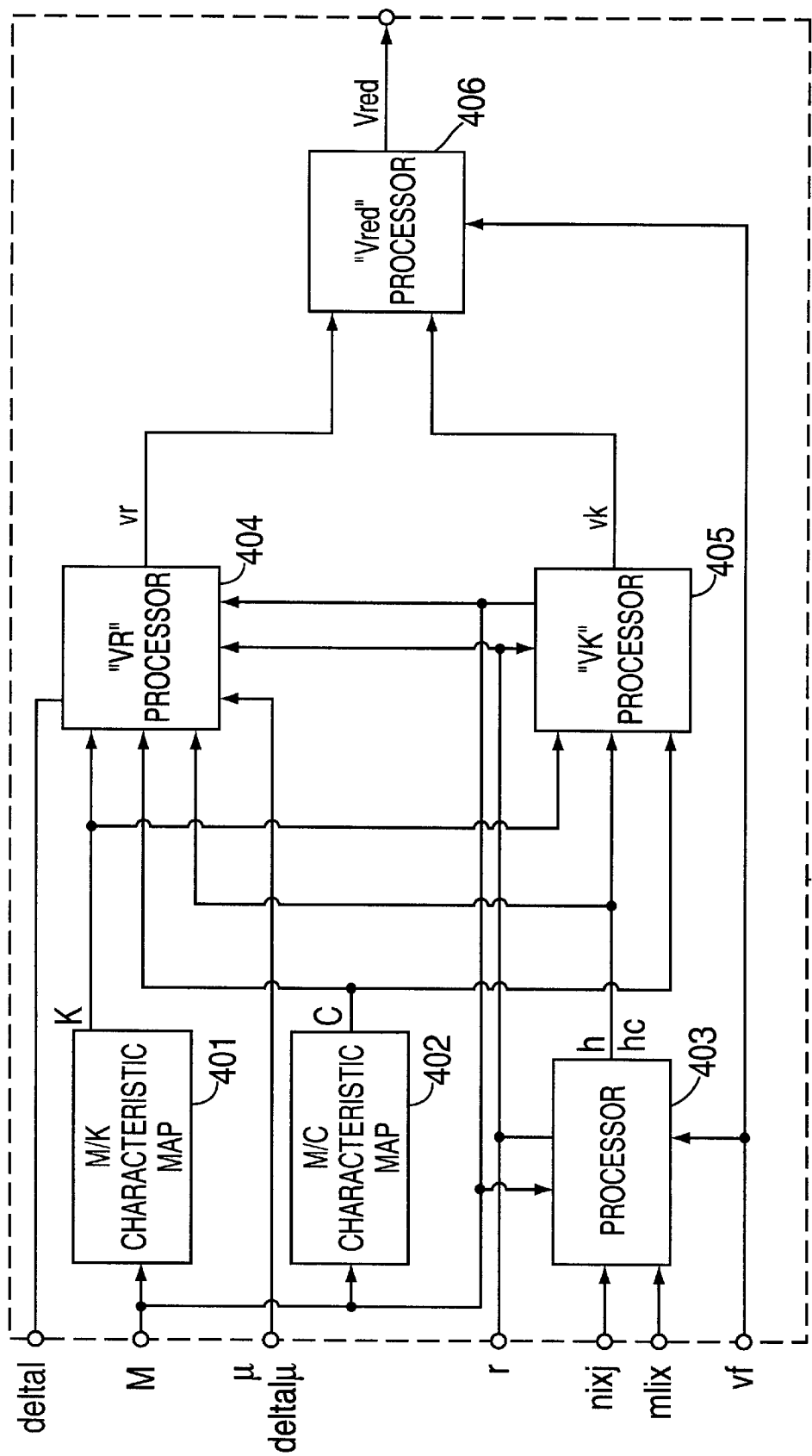
FIG. 4 shows a processor of the system of FIG. 3.

FIG. 4 which shows block 309 in greater detail is described below.

In a block 401, load displacement quantity K is determined on the basis of mass quantity M and is sent to a block 404 as well as to a block 405. Load displacement quantity K is determined as follows, for example: first, quantity K is determined by driving tests as a function of vehicle mass M for a vehicle or a vehicle combination composed of a towing vehicle and a trailer or a draw-bar trailer for a known load or for a liquid with a known density. A characteristics map is generated from the value pairs for quantities K and M and stored in "M/K" characteristic map block. Thus, a value for quantity K can be determined as a function of the value of quantity M sent to block 401. Determination of quantity K only as a function of the vehicle mass is suitable if the towing vehicle is operated with a known trailer or draw-bar trailer and if the density of the liquid load is known.

The determination of quantity K can be improved by determining quantity K for any vehicle combination and any load, i.e., for a liquid of any density. This has the following background: first, quantity K depends to a great extent on the respective trailer or draw-bar trailer, because the displacement of the liquid and thus the displacement of the center of gravity will vary as a function of the type of equipment provided to accommodate the load. Second, quantity K depends greatly on the volume of the load which can shift while driving. For example, a tanker with a tank 20% full will have greater displacement of the center of gravity than a tanker with a tank 70% full. Consequently, the density of the load is extremely important, especially with a liquid load, because the volume of the load and thus the ability of the center of gravity to shift play a significant role at a given mass. Thus, various characteristics maps may be stored in block 401 as a function of the trailer or draw-bar trailer used and as a function of the volume of the load. However, a trailer or draw-bar trailer identification would be necessary in the control unit to determine quantity K, and the control unit would have to be informed of the density of the load in a suitable manner. Then in block 401, quantity K can be determined as a function of the trailer or draw-bar trailer identified and as a function of the load volume determined. With a known mass of the empty vehicle, the load volume is determined from the vehicle mass and the density of the load. As an alternative, the volume of the liquid load can also be determined directly during the process of loading and/or unloading the equipment for accommodating the load. This is possible because tank cars, for example, have display equipment indicating the volume of the liquid load received or unloaded. To determine the instantaneous volume value, only the volume loaded or the volume unloaded is to be added to or subtracted from the last volume value which is advantageously stored in the control unit. With regard to the problems of load displacement, further reference is also made here to the research report "Die Kippgrenze von Sattelkraftfahrzeugen mit fester und flüssiger Ladung" [The stability limit of semitrailer tractors with solid and liquid loads] by H. Isermann which was published in the journal *Deutsche Kraftfahrtforschung und Strassenverkehrstechnik* [German Automotive Research and Traffic Technology], No. 200, VDI Verlag, Düsseldorf, 1970.

An alternative procedure to be followed with liquid loads of an unknown density is for a reference density to be assumed for this liquid and for quantity K to be determined with the help of this reference density. However, it should be pointed out that the reference density is selected so that any imminent danger of rollover or skidding can still be estimated realistically.

In a "vr"processor block 402, torsion quantity C is determined as a function of quantity M and sent to a "M/C" characteristic map block 404 as well as to a block 405. The determination of torsion quantity C takes place according to that of load displacement quantity K. First, quantity C is determined by driving tests as a function of vehicle mass M for a vehicle or a vehicle combination. A characteristics map is generated from the value pairs of quantities C and M and stored in block 402. Thus, a value for quantity C can be determined as a function of the value of quantity M sent to block 402. Determination of the characteristics map in advance can be supported by simulation calculations. An improvement in the determination of quantity C with regard to any vehicle combinations can be achieved according to the determination with load displacement quantity K.

In a processor block 403, first height quantity h and second height quantity hc are determined. The first height quantity is determined as follows, for example: first, dynamic running radii which describe the performance of the respective wheel are determined as a function of vehicle speed vf, wheel rpm nixj and path quantity r. On the basis of these dynamic running radii, first height quantity h, which corresponds to the height of the center of gravity, is determined by taking into account axle-specific wheel loads mlix, vehicle speed vf and path quantity r. Second height quantity hc is determined with the help of a characteristics map. This characteristics map is also determined in advance as a function of quantity M, e.g., by driving tests. A value for the second height quantity is determined in processor block 403 by using quantity M supplied to the block. Both height quantities h and hc are sent to block 404 and to "vk" processor block 405. In addition, path quantity r and mass quantity M are supplied to blocks 404 and 405. In addition, first friction quantity $\mu$ and second friction quantity deltas are also supplied to block 404.

Second limit value vr is determined in block 404 as a function of the quantities supplied to block 404 and sent to "Vred" processor block 406. In general, i.e., when the influences due to torsion and load displacement are taken into account, this second limit value vr is obtained, for example, according to the equation:

$$vr = \sqrt{\frac{g \cdot R \cdot C \cdot r \cdot \left(\mu r - \frac{1}{2} delta\mu\right)}{R \cdot C - delta\mu \cdot (hc + hsc \cdot M \cdot g + K \cdot C \cdot g)}} \quad (2)$$

Equation (2) is to apply to the vehicle shown in FIG. 2a, i.e., it should describe the state of affairs in taking a left turn. In equation (2), quantity g corresponds to the constant of gravitation (9.81 m/s$^2$) and quantity R corresponds to the track width. Quantity $\mu r$ describes the coefficient of friction on the right side of the vehicle and is determined on the basis of friction quantities $\mu$ and delta$\mu$. Quantity hsc describes the distance of the center of gravity of the vehicle from the vehicle axis, e.g., 206a in FIG. 2a, oriented in the longitudinal direction of the vehicle, about which axis the vehicle is twisted and/or displaced and/or deflected in reaction to a force acting on the vehicle. Quantity hsc is determined from the first and second height quantities. Equation (2) applies accordingly for a right turn, but in this case instead of $\mu r$ using $\mu l$, which is also determined on the basis of friction quantities $\mu$ and deltas. The determination of whether it is a right or left turn is made as a function of steering angle quantity deltal sent to block 404.

In considering a vehicle which is not transporting a mobile load and thus has no influences due to load displacement or only negligible influences due to load displacement, quantity vr is determined according to a simpler equation obtained from equation (2) for K=0. This should apply to the vehicles in FIGS. 2b and 2d, for example. If no different coefficients of friction occur on the right and left sides of the vehicle at the same time, the equation for determining vr is derived from equation (2) for K=0 and for delta$\mu$=0. For the case when there are no influences due to torsion or load displacement at the same time and there are no different coefficients of friction between the right and left sides of the vehicle, quantity vr is determined according to an equation derived from equation (2) for K=0, delta$\mu$=0 and c=∞. This should apply to the vehicle illustrated in FIG. 2c, for example.

First limit value vk is determined in block 405 as a function of the quantities supplied to block 405 and this limit value is then sent to block 406. In general, i.e., when the influences due to torsion and load displacement are taken into account, this first limit value vr is obtained, for example, according to the equation:

$$vk = \sqrt{\frac{g}{2} \cdot \frac{R \cdot C \cdot r}{g \cdot hsc \cdot M + K \cdot C \cdot g + h \cdot C}} \qquad (3)$$

Equation (3) is to apply to the vehicle illustrated in FIG. 2a. Apart from the statements regarding the two coefficients of friction, the statements made above for equation (2) also apply to equation (3) accordingly.

The cases described above, which lead to different equations for determining limit values vr and vk on the basis of equations (2) and (3), are determined by the determination of the quantities supplied to block 309. As an alternative, if it is known that a given vehicle combination is not used for transporting a liquid load, for example, an equation that has been simplified accordingly may be stored in blocks 404 and 405.

In addition to two limit values vr and vk, vehicle speed vf is also supplied to block 406. As a function of these quantities, it is determined whether stabilization of the vehicle is necessary. The result of this determination is output with the help of quantity vred. First, the limit value with the smaller value is selected as the reference quantity from two limit values vr and vk in block 406. Vehicle speed vf is compared with this reference quantity. If vehicle speed vf is greater than the reference quantity, this indicates an unstable condition of the vehicle and the vehicle must be stabilized. Quantity vred is assigned a value TRUE. However, if the vehicle speed is less than the reference quantity, this indicates that the vehicle is in a stable condition and that stabilization of the vehicle should not be necessary. Accordingly, quantity vred is assigned a value FALSE.

FIG. 5 is described below and shows a flow chart of the sequence of the method according to an exemplary invention. The method according embodiment of the present to an exemplary embodiment of the present invention begins with a step 501, where quantities C, hc, h, K, $\mu$, delta$\mu$, M, r and vf are provided or supplied. With regard to the determination of these quantities, reference is made to the description of blocks 306, 307, 308, 310, 401, 402 and 403. Step 501 is followed by a step 502, where two limit values vr and vk are determined. In this regard, reference is made to the description of blocks 404 and 405.

Following step 502, a step 503 is performed out, where the smaller of the two limit values vr and vk is determined as reference quantity vmax. In the next step 504, vehicle speed vf is compared with reference quantity vmax. Reference should be made here to the description of block 406. However, quantity vred is not shown in FIG. 5. If vehicle speed vf is less than reference quantity vmax, then step 501 is carried out again following step 504. This corresponds to the assignment of a value FALSE to quantity vred. However, if it is found in step 504 that the vehicle speed is greater than reference quantity vmax, a step 505 is carried out following step 504. In this step, retarder measures (or interventions) and/or engine measures and/or braking measures are implemented so that the vehicle speed is reduced and thus the vehicle is stabilized. FIG. 5 does not show the control signals for the individual components mentioned above. Following step 505, step 501 is carried out again.

The exemplary embodiments of the above descriptions, including the Figure, is not intended to restrict the scope of the present invention in any way. In summary, in addition to the skidding behavior of the vehicle in the plane, the rolling motion of the vehicle about a vehicle axis oriented in the longitudinal direction of the vehicle is also determined with the method according to an exemplary embodiment of the present invention. This rolling motion may vary greatly according to the road surface and the load condition of the vehicle, and under some circumstances it may lead to the vehicle rolling over. The method and the device according to an exemplary embodiment of the present invention are designed so that the sensor technology required for this purpose is accommodated in the towing vehicle in the case of combined vehicle arrangements.

What is claimed is:

1. A method for stabilizing a vehicle, the method comprising the steps of:

determining a speed quantity corresponding to a vehicle speed;

determining at least two limit values for the vehicle speed;

selecting a smaller one of the at least two limit values as the reference quantity;

comparing the speed quantity and the reference quantity and providing a comparison result; and if the speed quantity is greater than the reference quantity, intervening to avoid at least one of the vehicle rolling over about a vehicle axis oriented in a longitudinal direction of the vehicle and the vehicle skidding in a transverse direction by intervening in at least one of a retarder operation, an engine operation, and a braking operation to reduce the vehicle speed until the speed quantity is no greater than the reference quantity.

2. The method of claim 1, wherein the at least two limit values include at least one of a first limit value corresponding to a vehicle rollover risk and a second limit value corresponding to a vehicle skidding risk.

3. The method of claim 1, further comprising one of the steps of:

(a) determining at least one friction quantity corresponding to friction conditions between at least one vehicle tire and a road surface, wherein at least one of the at least two limit values is determined based on the at least one friction quantity; and (b) determining a first friction quantity corresponding to a current coefficient of friction and a second friction quantity corresponding to a difference between coefficients of friction of each side of the vehicle, wherein at least one of the at least two limit values is determined based a smaller one of the first friction quantity and the second friction quantity.

4. The method of claim 1, further comprising one of the steps of:

(a) determining a torsion quantity corresponding to a vehicle behavior that occurs in reaction to one of a force and a transverse force acting on the vehicle with respect to the vehicle axis, wherein at least one of the at least two limit values is determined based on the torsion quantity; and (b) determining a torsion quantity corresponding to a vehicle behavior that occurs in reaction to one of a force and a transverse force acting on the vehicle with respect to the vehicle axis, wherein at least one of the at least two limit values is determined based on the torsion quantity and the torsion quantity is determined based on a mass quantity corresponding to a vehicle mass;

wherein the vehicle behavior corresponds to the vehicle being at least one of turned, twisted and displaced about the vehicle axis.

5. The method of claim 1, further comprising at least one of the steps of:
   (a) determining a first height quantity corresponding to a distance between a center of gravity of the vehicle and a road surface, wherein the first height quantity is determined based on a wheel rotational rate;
   (b) determining a second height quantity corresponding to another distance between the road surface and the vehicle axis about which the vehicle is one of twisted, displaced and deflected in reaction to one of the force and the transverse force acting on the vehicle; and
   (c) determining the second height quantity corresponding to another distance between the road surface and the vehicle axis about which the vehicle is one of twisted, displaced and deflected in reaction to one of the force and the transverse force acting on the vehicle, wherein the second height quantity is determined based on a mass quantity corresponding to the vehicle mass;
   wherein at least one of the at least two limit values is determined based on at least one of the first height quantity and the second height quantity.

6. The method of claim 1, further comprising the step of determining a mass quantity, which corresponds to a vehicle mass, based on a force quantity corresponding to a driving force acting on the vehicle and a rate quantity corresponding to at least one wheel rotational rate, wherein at least one of the at least two limit values is determined based on the mass quantity.

7. The method of claim 1, further comprising the step of determining a load displacement quantity corresponding to a load behavior of a load of the vehicle that occurs in reaction to one of the force and the transverse force acting on the vehicle, wherein at least one of the at least two limit values is determined based on the load displacement quantity and the load behavior corresponds to the load being at least one of moved, shifted and displaced.

8. The method of claim 7, further comprising at least one of the steps of:
   (a) determining a mass quantity; and
   (b) determining a volume of the load based on one of the mass quantity and a quantity corresponding to a form of a vehicle load device, wherein if the load is a fluid load, then the volume is determined during one of a loading and unloading of the vehicle load device;
   wherein the load-shift quantity is determined based on at least one of the mass quantity and the volume.

9. The method of claim 1, further comprising one of the steps of:
   (a) determining at least one of the at least two limit values based on a path quantity corresponding to a radius of a current path of the vehicle; and
   (b) determining at least one of the at least two limit values based on the path quantity, wherein the path quantity is determined based on the speed quantity and a steering angle quantity corresponding to a steering angle of the vehicle.

10. A device for stabilizing a vehicle, comprising:
   means for determining a speed quantity corresponding to a vehicle speed;
   means for determining at least two limit values for the vehicle speed;
   means for selecting a smaller one of the at least two limit values as the reference quantity;
   means for comparing the speed quantity and the reference quantity and providing a comparison result; and
   means for intervening, if the speed quantity is greater than the reference quantity, to avoid at least one of the vehicle rolling over about a vehicle axis oriented in a longitudinal direction of the vehicle and the vehicle skidding in a transverse direction by intervening in at least one of a retarder operation, an engine operation, and a braking operation to reduce the vehicle speed until the speed quantity is no greater than the reference quantity.

* * * * *